(12) United States Patent
Balachandran et al.

(10) Patent No.: US 7,480,508 B2
(45) Date of Patent: Jan. 20, 2009

(54) METHOD FOR TRACKING USERS IN A COMMUNICATION NETWORK

(75) Inventors: Krishna Balachandran, Morganville, NJ (US); Kenneth C. Budka, Marlboro, NJ (US); Arnab Das, Washington, DC (US); Michael F. Dolan, Bolingbrook, IL (US); Joseph H. Kang, Belle Mead, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 0 days.

(21) Appl. No.: 11/712,396

(22) Filed: Mar. 1, 2007

(65) Prior Publication Data

US 2007/0149217 A1 Jun. 28, 2007

Related U.S. Application Data

(62) Division of application No. 10/642,600, filed on Aug. 19, 2003, now Pat. No. 7,260,396.

(51) Int. Cl.
*H04Q 7/20* (2006.01)

(52) U.S. Cl. ............... 455/435.1; 455/433; 455/432.1; 455/436; 455/440; 370/332

(58) Field of Classification Search ... 455/432.1–432.3, 455/433, 435.1–435.3, 436–444, 448, 453, 455/456.1–457, 524–525; 370/331–335, 370/338, 348
See application file for complete search history.

(56) References Cited

U.S. PATENT DOCUMENTS

| | | | | |
|---|---|---|---|---|
| 5,537,460 A | 7/1996 | Holliday et al. | ........... | 455/435.1 |
| 5,588,043 A | 12/1996 | Tiedemann et al. | ....... | 455/435.1 |
| 5,659,596 A | 8/1997 | Dunn | ...................... | 455/456.1 |
| 6,748,213 B1 * | 6/2004 | Kim | ............................ | 455/433 |
| 6,879,825 B1 | 4/2005 | Daly | .......................... | 455/419 |
| 6,952,574 B2 * | 10/2005 | Tealdi et al. | ............. | 455/404.2 |
| 7,039,409 B2 * | 5/2006 | Lobinger et al. | ............ | 455/443 |
| 7,054,297 B1 | 5/2006 | Smith | ......................... | 370/338 |
| 7,123,918 B1 | 10/2006 | Goodman | ................... | 455/446 |
| 7,236,764 B2 * | 6/2007 | Zhang et al. | ................ | 455/346 |
| 7,260,396 B2 * | 8/2007 | Balachandran et al. | ... | 455/435.1 |
| 2002/0123353 A1 * | 9/2002 | Savoie | ........................ | 455/456 |
| 2002/0196749 A1 * | 12/2002 | Eyuboglu et al. | ........... | 370/328 |
| 2003/0087653 A1 | 5/2003 | Leung et al. | ................ | 455/502 |
| 2003/0104801 A1 | 6/2003 | Koulakiotis et al. | ......... | 455/406 |
| 2003/0129980 A1 | 7/2003 | Sayeedi | ...................... | 455/435 |
| 2003/0134655 A1 | 7/2003 | Chen et al. | .................. | 455/522 |
| 2003/0224790 A1 * | 12/2003 | Choi | ....................... | 455/435.3 |

(Continued)

OTHER PUBLICATIONS

R. Sinnarajah, "1x BCMCS Overview of cdma2000 L2/L3 Design," 3GPP2cdma2000TSG-C C30-2003-0512-013. Qualcomm, May 2003.

(Continued)

*Primary Examiner*—Kamran Afshar

(57) ABSTRACT

In a method of tracking a user in a communication network supporting a broadcast-multicast service, the network classifies groups of users into tracking areas. Movement of a user may be tracked as the user crosses a boundary between two tracking areas in the network. The method may enable a balance to be achieved between use of uplink overhead and the level or granularity of tracking desired, so as to conserve radio resources.

5 Claims, 3 Drawing Sheets

U.S. PATENT DOCUMENTS

| | | | |
|---|---|---|---|
| 2003/0232594 A1 | 12/2003 | Shaheen | 455/3.06 |
| 2004/0017809 A1 | 1/2004 | Park | 320/390 |
| 2004/0157600 A1* | 8/2004 | Stumpert et al. | 455/432.1 |
| 2004/0180675 A1 | 9/2004 | Choi et al. | 455/458 |
| 2004/0203756 A1 | 10/2004 | Lin et al. | 455/433 |
| 2004/0203867 A1* | 10/2004 | Schmidt | 455/456.1 |
| 2004/0203979 A1 | 10/2004 | Attar et al. | 455/522 |
| 2004/0219932 A1* | 11/2004 | Verteuil | 455/456.2 |
| 2005/0036510 A1* | 2/2005 | Sarikaya et al. | 370/469 |
| 2005/0079867 A1* | 4/2005 | Balachandran et al. | 455/435.1 |
| 2006/0109812 A1* | 5/2006 | Kim et al. | 370/329 |
| 2006/0148487 A1 | 7/2006 | Kim et al. | 455/456.1 |
| 2007/0178917 A1* | 8/2007 | Balachandran et al. | 455/458 |

OTHER PUBLICATIONS

K. Jang et al., "Mobile Paging with Mobile Station Paging Zone Update," 3GPP2cdma2000TSG-C C-23-20030714-038R3. Nortel, Jul. 2003.

* cited by examiner

TA1     TA2

METHOD FOR TRACKING USERS IN A COMMUNICATION NETWORK

DOMESTIC PRIORITY INFORMATION

This is a divisional application of application Ser. No. 10/642,600 filed Aug. 19, 2003 now U.S. Pat. No. 7,260,396, the entire contents of which are hereby incorporated by reference.

BACKGROUND OF THE INVENTION

1. Field of the Invention

The present invention relates to tracking users in communication systems or networks supporting Broadcast-Multicast services (BCMCS).

2. Related Art

Current second generation and third generation wireless systems are primarily designed to support unicast voice and data services. The support of these unicast services to the end user has been achieved through various advances in wireless and networking technologies. The current emphasis in international standardization bodies such as 3GPP and 3GPP2 is on the design of protocols and procedures that allow the support of Broadcast-Multicast Services (BCMCS) over evolving networks. BCMCS is a bandwidth-conserving technology that reduces traffic by simultaneously delivering a single stream of information to a large number of recipients. Examples of these services include voice dispatch or Press-To-Talk (PTT) type services, broadcast/multicast streaming, etc.

There has been recent industry interest in the Public Safety Wireless Network (PSWN) context, where support of BCMCS may be especially important in terms of radio resource management. Radio resource management procedures may be needed to achieve low delay in establishment and delivery of BCMCS content, to provide scalability in terms of the number of multicast groups and/or number of users per multicast group, and to provide advanced service capabilities (e.g., ability to monitor/extract content from multiple BCMCS streams). Further, radio resource management procedures may be needed to achieve high spectral efficiency, to provide security (authentication, encryption and identity protection), and to improve mobile station battery life. Thus, radio resource management procedures that improve spectral efficiency and/or provide service flexibility are of interest to network operators.

In the unicast context, tracking of mobile stations within a geographic area is used primarily for the purposes of efficiently paging a mobile station. Mobile station tracking may perhaps become perhaps more important when assigning radio resources in the multicast context. In a cellular network, shared multicast radio channels should ideally be activated in a zone of cells or sectors for reliable reception. Depending on the level, or granularity, of tracking (i.e., accuracy of information at the network regarding the whereabouts of a BCMCS/PTT subscriber), radio resources may not be assigned in the proper sectors. As a result, there could be a significant loss in spectral efficiency for the network operator, and/or loss in quality of service perceived by a BCMCS/PTT subscriber.

Mobile stations that have an active uplink (e.g., those that send traffic or control signaling at regular intervals) can be tracked at the granularity of a sector. However, this is not expected to be the predominant operating mode for BCMCS/PTT where mobile stations are mostly idle or actively monitoring BCMCS content on the downlink. In such cases, it may be impractical for each user to maintain an active uplink, due to potentially large numbers of BCMCS subscribers. For such situations where maintenance of an active uplink is not feasible, tracking is typically accomplished through timer-based or event driven registration procedures. In addition to assisting procedures such as tracking, mobile station registration procedures also provide, to the network, information regarding subscription to specific services, radio priorities, etc. Timer-based procedures require mobiles to register with the network at given intervals (e.g. periodic intervals). Event driven triggers require mobiles to send a registration message to the network when an important event occurs (e.g. mobile decodes a change in location area).

Depending on the options employed for registration, either fine tracking of mobiles down to the granularity of a sector, or coarse tracking of mobiles over a large number of sectors, is possible. If coarse tracking is employed, physical broadcast/multicast (BCMC) radio channels may need to be established in a large number of sectors that are not needed for reliable BCMCS content delivery, resulting in a waste of radio resources. Since it may not be possible to derive the benefits of power control in a network supporting BCMCS the power fractions needed to support a BCMC radio channel can be quite high. This limits the number of BCMC radio channels and/or unicast channels that can be simultaneously supported within a sector. Coarse tracking may therefore be unacceptable and may waste potentially scarce radio resources, as the network may have to transmit a BCMC stream within a large area, including sectors where mobile stations may not be present. On the other hand, tracking at the level of a sector (fine tracking) can result in excessive uplink overhead arising from frequent and sometimes unnecessary registrations by the mobile stations, thus overloading the uplink.

Mechanisms currently proposed for BCMCS registration include timer-based registration; registration on occurrence of certain events (e.g., power on, starting or stopping to monitor a multicast group); Registration Required Indication enabled in broadcast system parameter overhead on a new sector; and use of paging zone updates. These registration mechanisms are not well suited to tracking BCMCS subscribers that have any significant mobility (movement) across the network.

With timer based registrations, short timer values (the timer value may depend on the user mobility and desired accuracy) are needed for accurate tracking, otherwise the time elapsed from the previous registration may be quite long, potentially resulting in considerable ambiguity regarding mobile station location at the start of a BCMCS/PTT call. Long timers require radio resources to be assigned over a larger area to account for tracking uncertainty, thus resulting in spectral inefficiency. Although short timer values allow finer tracking, they result in large uplink overhead and reduce mobile battery life. They also result in repetitive unnecessary registrations from static (stationary) users.

Events such as "power on" and "start/stop monitoring" tend to be quite infrequent and dependent on end user behavior. As a result, these registration 'triggers' are not likely to be sufficient for the purpose of tracking. Relying on alternative fine tracking mechanisms such as the use of a "Registration Required" indicator bit within the broadcast system parameter overhead (i.e., group polling) of each sector may also give rise to a large number of spurious registrations from relatively static mobiles. Since the total number of BCMCS/PTT groups may be quite large, introducing such group polling mechanisms for all possible groups is inefficient.

Paging zone updates have been proposed to reduce downlink paging load for packet data services in cdma2000®, Revision D. Each paging zone is assigned a paging zone identifier which is indicated in the broadcast overhead by all sectors within the paging zone. Mobile stations are associated with the paging zone corresponding to the sector having the strongest received pilot strength. The mobile stations report back to the network every time the paging zone changes. While this paging zone technique is reasonable in the unicast context, it does not allow efficient operation in the case of BCMCS. In particular, since mobile stations do not report updates regarding soft handoff candidates (i.e., sectors from which the received signal strength is sufficiently high) for a BCMC radio channel unless a sector from a different paging zone becomes the strongest in terms of pilot strength, this approach may not be suited to supporting soft handoff at paging zone boundaries. Moreover, hysteresis timers employed in paging zone updates for registration ensure that users will keep sending paging zone registration update messages upon hysteresis timer expiration, even if the paging zone corresponding to the strongest sector is unchanged.

SUMMARY OF THE INVENTION

Exemplary embodiments of the present invention are direction to a method of tracking a user in a communication network supporting a broadcast-multicast service. In the method, the network classifies groups of users into tracking areas. Movement of a user may be tracked as the user crosses a boundary between two tracking areas in the network. The method may enable a balance to be achieved between use of uplink overhead and the level or granularity of tracking desired, so as to conserve radio resources.

BRIEF DESCRIPTION OF THE DRAWINGS

Exemplary embodiments of the present invention will become more fully understood from the detailed description given herein below and the accompanying drawings, wherein like elements are represented by like reference numerals, which are given by way of illustration only and thus are not limitative of the exemplary embodiments of the present invention and wherein.

DETAILED DESCRIPTION OF EXEMPLARY EMBODIMENTS

Although the following description is described as based on a generic wireless communication network or system supporting Broadcast-Multicast services (BCMCS), and will be described in this exemplary context, it should be noted that the exemplary embodiments shown and described herein are meant to be illustrative only and not limiting in any way. As such, various modifications will be apparent to those skilled in the art for application to wireless communication systems or networks based on 3G-1x EV-DO, 3G-1x EV-DV and UMTS technologies that may currently support or be adapted to support BCMCS, for example, and are contemplated by the teachings herein.

Additionally where used below, the term 'user' may be considered synonymous to user equipment, subscriber, BCMCS subscriber, mobile station, remote station, access terminal, etc., and describes a remote user of wireless resources in a wireless communication network. A user may also be occasionally referred to as a receiver of a multicast message. The terms base station and Node-B may be considered synonymous, and describe equipment that provides data connectivity between a network and one or more mobile stations. A system or network (such as an access network) may include one or more base stations.

Point-to-multipoint services such as BCMCS allow data from a single source entity to be transmitted to multiple endpoints. BCMCS is intended to efficiently use radio/network resources in transmitting data over a radio channel. Data may be transmitted to multicast areas as defined by the network. A network may selectively transmit BCMCS content on sectors within the multicast area which contain members of a multicast group.

A BCMCS received by a user may involve one or more successive multicast sessions. For example, a BCMCS service might consist of a single on-going session (e.g. a multimedia stream) or may involve several intermittent BCMCS sessions over an extended period of time (e.g. messages). Applications that may take advantage of BCMCS, and hence, of the exemplary embodiments of the present invention, may include, but are not limited to, voice dispatch or Press-To-Talk (PTT) type services, broadcast/multicast streaming, videoconferencing, corporate communications, distance learning, online bidding, online gaming and distribution of software, stock quotes, and news, etc.

In general, the exemplary embodiments of the present invention are directed, in one aspect, to a method of tracking a user moving across a network in such a way that a balance, or tradeoff, may be achieved between uplink overhead and the level or granularity of tracking desired. Tracking users at a finer granularity enables a more efficient use of forward link radio resources, but requires increasingly large reverse link overhead.

Figure 2:
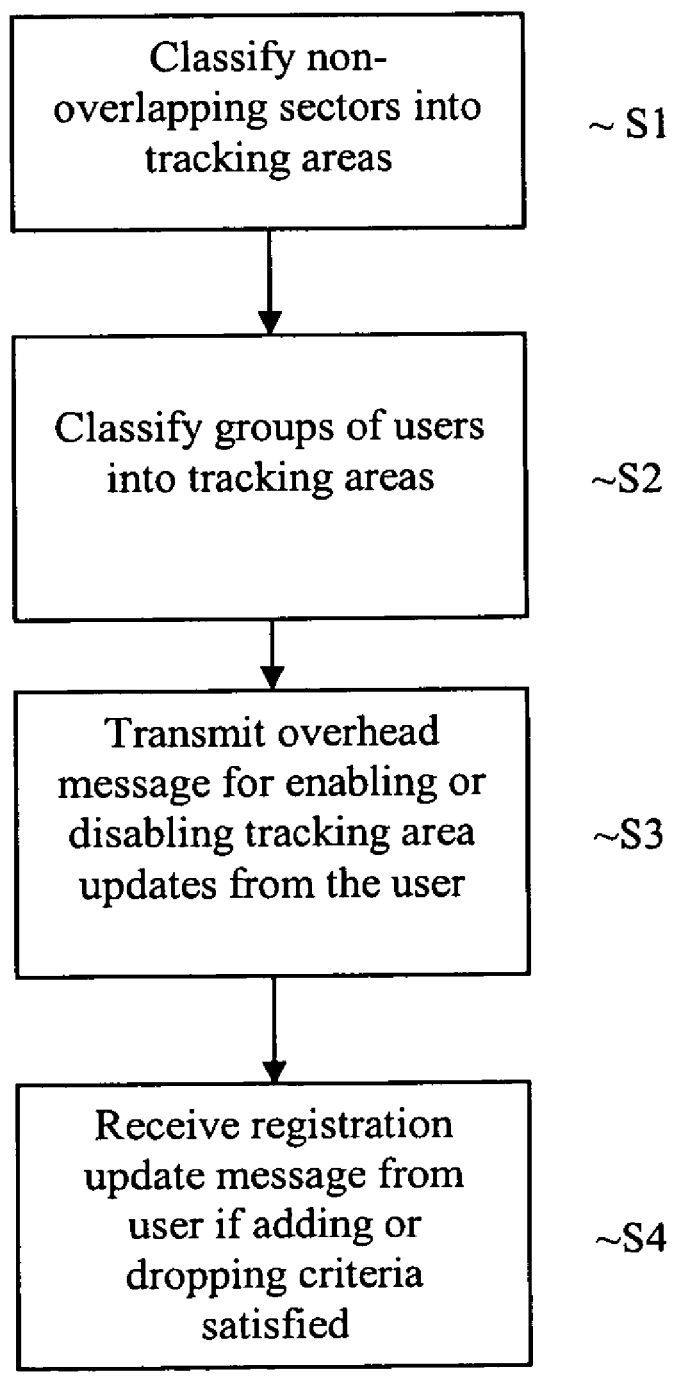
FIG. 2 is a flow chart illustrating steps of an example tracking method.

The network classifies groups of sectors into what are referred hereafter as 'tracking areas' as shown by S1 in FIG. 2. Tracking areas may be understood as one or more groups of sectors, or a collection of groups of sectors, where each sector may contain users that subscribe to BCMCS content as shown by S2 in FIG. 2. Classifying groups of sectors into tracking areas may enable mobile stations to be accurately tracked, without wasting radio resources, as the mobile stations move across the network. This may provide benefits, both in terms of paging, as well as for efficiently assigning radio resources for BCMCS.

As to be described in further detail hereafter, mobile station procedures may be defined to allow tracking area change updates (e.g. detection of tracking area changes and/or transmission of tracking area registrations) with minimal uplink and downlink overhead, thereby improving system capacity and reducing mobile battery consumption.

For the following discussion, a mobile station may be referred to as 'BCMCS active' if the mobile station is actively monitoring any BCMCS group, and as 'BCMCS idle' otherwise. Tracking area registration procedures are discussed separately for each of these cases.

Non-overlapping groups of sectors are classified into BCMCS tracking areas. A system overhead message, commonly referred to as 'Broadcast Service Parameters Message' is transmitted by each sector and indicates whether or not tracking area updates are required for one or more designated users in the sector as shown by S3 in FIG. 2. This may be achieved, for example, by including a single "Tracking Area Update Enabled Indicator" (TAUEI) bit in the system overhead of the sector. This bit may be set to '0' to represent that tracking area updates are disabled for the sector and set to '1' to indicate that tracking area updates are enabled for the sector. For example, the network may disable tracking area updates by setting TAUEI to '0' within the interior of a tracking area and enable tracking area updates in sectors on a boundary between two or more tracking areas by setting this bit to '1'. The network may also use this bit to disable tracking area updates if it determines that the uplink is overloaded.

Each sector may also include a timer value, referred to as $T_{reg}$, in system overhead messages. $T_{reg}$ is required between registrations in order to reduce uplink overhead; thus the timer value is provided in order to control the rate at which registrations are sent on the uplink (e.g. for users that straddle tracking area boundaries and trigger multiple event-based registrations within short intervals. Adding and dropping criteria are employed to maintain a shortlist of sectors for the purpose of determining a tracking area change. Similar criteria are employed in systems that rely on soft handoff (e.g., cdma2000, UMTS (where mobile stations soft-combine duplicate transmissions from multiple sectors)) where only neighboring sectors that satisfy certain adding criteria (e.g., pilot strengths exceeding a given $T_{ADD}$ threshold) are considered candidates for soft combining. These sectors are no longer considered candidates if the sectors do not meet certain dropping criteria (e.g., pilot strengths fall below a given $T_{DROP}$ threshold for some period of time).

BCMCS idle mobile stations moving across tracking area boundaries may provide tracking area registration updates, for example as shown by S4 in FIG. 2, to the network upon expiration of a configurable minimum time interval, $T_{reg}$, if one of the following conditions hold:

(a) At least one of the M strongest sectors (highest pilot channel signal strength) that have satisfied the adding criteria, but have not yet been dropped, belongs to a different tracking area, as compared with the previous reporting instance; or (b) If pilot strengths from all sectors belonging to a tracking area that was previously reported satisfy the dropping criteria (exceed $T_{DROP}$).

The tracking area registration update messages sent on the uplink to the network may also include the pilot strengths of the N strongest sectors, assuming that these have satisfied the adding criteria but have not yet satisfied the dropping criteria. The network may use this information in order to determine in which sectors to page a mobile, or in which sectors radio resources need to be assigned to a particular BCMC group of users.

Tracking areas for BCMCS may have much finer granularity than conventional registration zones or paging zones, since the primary purpose of the tracking areas is for efficiently assigning radio resources to BCMC traffic, not solely paging. However, there is still value in 'piggybacking', e.g., including the BCMCS tracking area when performing a paging zone/registration zone update or vice versa. In the event that such piggybacking is employed, timer based controls (i.e., adjustment of $T_{reg}$ or similar alternative timers employed to mitigate registration load from paging or registration zone changes) are exercised to ensure that the total registration load due to registration zone, paging zone and BCMCS tracking area procedures does not exceed a maximum, given registration load resulting from any one of these procedures.

A BCMCS active mobile station that detects a change in tracking area sends a registration only if it determines that a BCMC group call (i.e., the flow(s) of IP packets containing communications directed to members (users) of the multicast group) it is interested in monitoring is not already assigned radio resources in one or more of the M strongest sectors, for example as shown by S4 in FIG. 2. The BCMGS active mobile may determine this by decoding system overhead messages from each candidate sector that satisfies the aforementioned adding criteria. Alternatively, the strongest serving sector can include such neighbor sector information (e.g. physical channel configuration etc.) for each group in its overhead where it can be obtained by the BCMCS active mobile.

In such cases, the tracking area registration update may additionally include fields identifying the BCMCS flow(s) that the BCMCS active mobile is interested in monitoring. Separate overhead bits may be employed by each sector to indicate whether or not a BCMCS active mobile station subscribing to a particular group is allowed/required to send such registrations.

Figure 1:
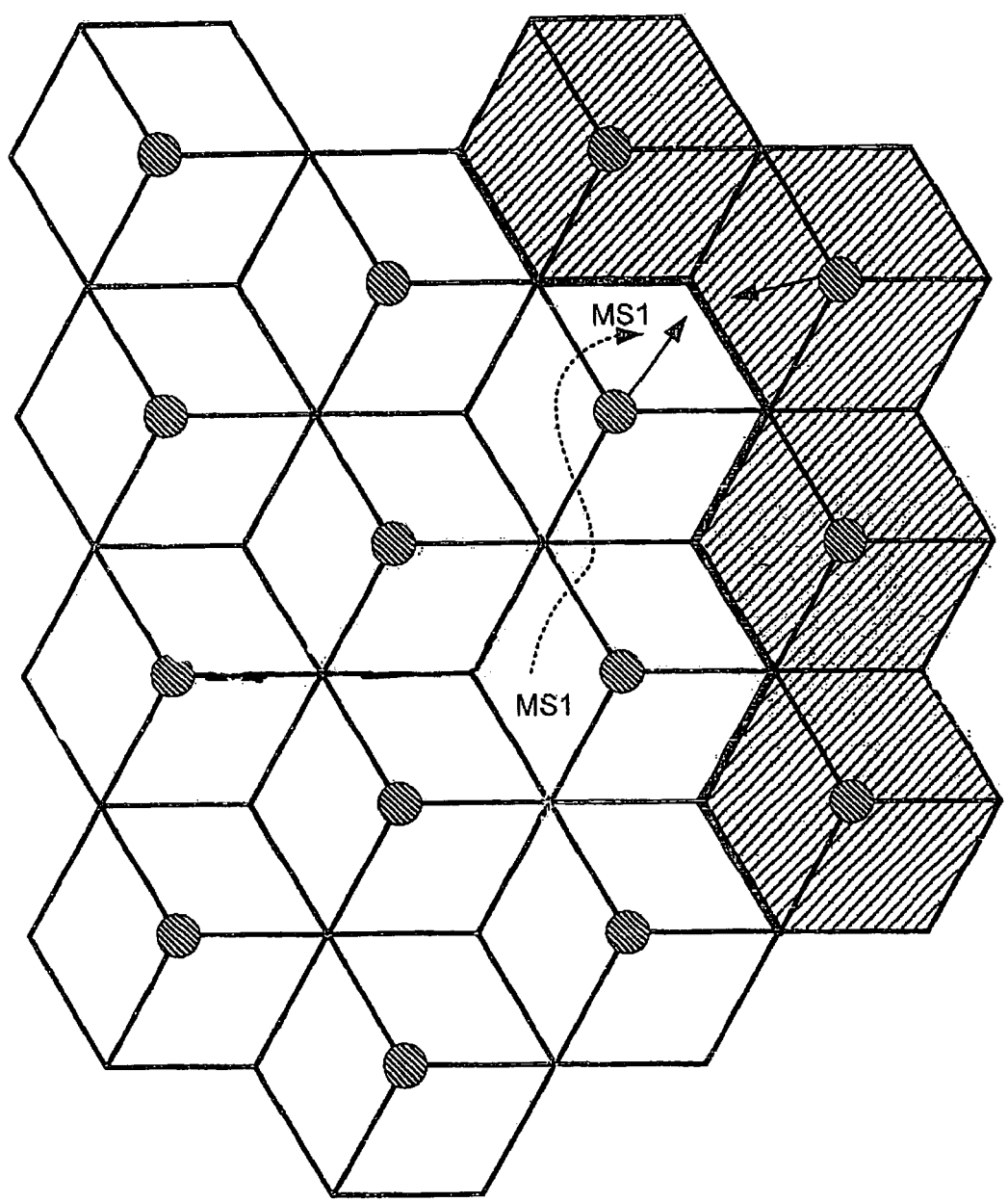
FIG. 1 illustrates a mobile station registration procedure upon detection of a tracking area change in accordance with the exemplary embodiments of the present invention.
Figure 1:
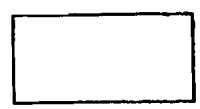
Figure 1:

FIG. 1 illustrates a mobile station registration procedure upon detection of a tracking area change in accordance with the exemplary embodiments of the present invention. Referring to FIG. 1, a mobile station (MS1) initially detects a pilot signal ('pilot') of a sector only from tracking area 1 (TA1). MS1 subsequently moves to a location where it detects pilots from sectors belonging to TA1 and TA2. Upon expiration of the timer $T_{reg}$, if the adding criteria (e.g. MS1 compares the pilots to the $T_{ADD}$ threshold) are met, MS1 detects a change in tracking area and sends a registration that is triggered by the tracking area change of MS1 from TA1 to TA2. This registration, which may be referred to as a 'tracking area update registration message', is transmitted by MS1 on the uplink to the network. The timer $T_{reg}$ is started when the registration is transmitted by MS1.

The approach described in FIG. 1 does not result in spurious registrations if the tracking area is unchanged. As a result, sectors with pilots that meet the adding criteria but are weaker than the strongest serving sector can still trigger tracking area registrations and soft combining benefits. In other words, improved performance and/or reduced power requirements can be achieved.

The following exemplary embodiments of the above method describe detecting tracking area changes and triggering tracking area registration updates.

BCMCS Tracking Area Index (BTAI) Approach:

In this approach, sectors within a tracking area are assigned a Tracking Area Index (TAI). Each sector carries the BCMCS Tracking Area Index (BTAI) and Tracking Area Update Enabled Indicator (TAUEI) in an overhead message. The TAUEI may be implicit in the BTAI if a BTAI value is reserved to disable tracking area registration updates, or if the BTAI value is not included in the overhead message. BTAI overhead can be reduced by reusing BTAI values in tracking areas that are sufficiently far apart. If a TAUEI for the current sector (e.g. sector with strongest pilot) is enabled and timer $T_{reg}$ has expired, mobile stations examine the BTAIs of the strongest serving sector and candidate neighbors (e.g. M strongest sectors that have satisfied adding criteria and have not yet been dropped) in order to determine changes in tracking area from the previous transmission of a tracking area registration. If a change is detected, then a tracking area registration that indicates this change is sent and the timer $T_{reg}$ is restarted.

Figure 3:
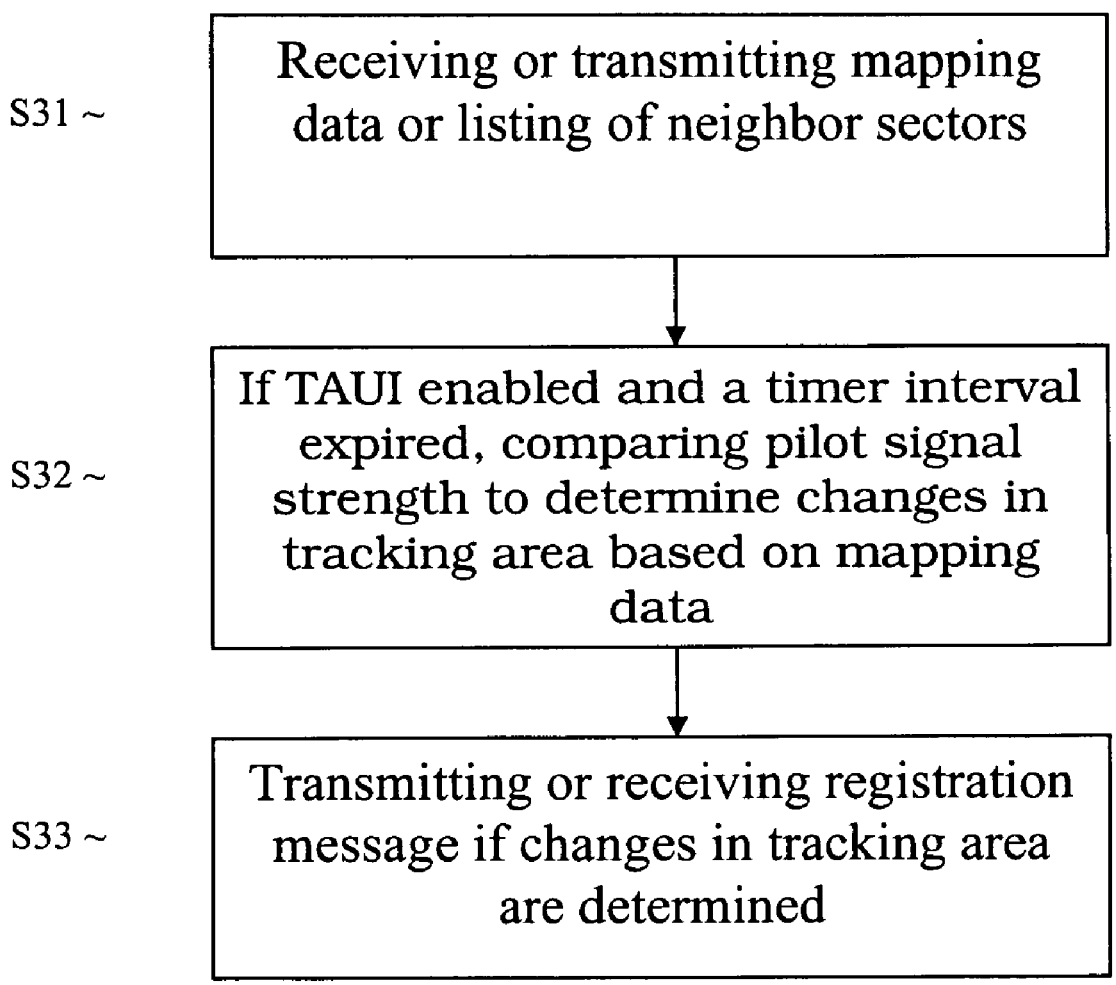
FIG. 3 is a flow chart illustrating steps of an example tracking method.

The BTAI approach enables mobile stations to determine tracking area changes without any ambiguity and can avoid spurious registrations on the uplink. However, if neighbor sector BTAIs are not indicated by each sector within the overhead message, changes in tracking area resulting from weaker neighbor sectors that satisfy adding criteria (rather than a change in the strongest serving sector) may only be detected by independently decoding the overhead channels of these neighbor sectors. BTAI values of all sectors in the neighbor list are included in the overhead message if the network determines that reliable decoding of these neighbors is not possible Sector Identifier Approach:

In this approach, tracking area indices are not indicated in the overhead message, and mobile stations need not be made aware of BTAIs. However, a sector identifier may be determined through other means. Exemplary methods include pilot PN offset detection (as in IS-95/cdma2000 systems), primary scrambling code detection (as in UMTS) or explicit signaling within the overhead messaging channel. Tracking area changes may be detected by the mobile station in one of the following three ways, as illustrated by FIG. 3.

(a) BCMCS Tracking Area to Sector Mapping

There is a mapping or association between sector identifiers and tracking areas that is either established a priori and known to the mobile station or is indicated through explicit signaling. A specific pre-determined mapping that is known to both the network and mobile station can be specified. Alternatively, the mapping can be described in generic terms such as a parametric description with precise configuration of parameters through signaling in the overhead message, as shown in step S31 of FIG. 3.

(b) BCMCS Neighbor Sector Tracking Area Indicator Bitmap

For each sector, a list of neighboring sectors will be specified by the network, as shown in step S31 of FIG. 3. The list of neighbor sectors may the same as that employed for unicast services or may be unique for BCMCS. Signal strengths from sectors included in this neighbor list are typically measured by mobile stations in order to determine whether they are candidates for soft handoff. Each sector's overhead message may indicate whether sectors in the neighbor list belong to the same tracking area as the sector or to a different tracking area. Table 1 is an exemplary bitmap for the case with eight neighbors (neighboring sectors). Each neighbor is denoted as $n_{ij}$, where i denotes the tracking area and j denotes the neighbor sector index for the $i^{th}$ tracking area. As shown in Table 1, each sector could just transmit a single bit for each neighbor sector indicating whether the neighbor sector's tracking area matches that of the current sector, in step S31.

In Table 1, sectors n11, n12, and n13 are three sectors that belong to the same tracking area, BTA1 as the current sector. Hence, the indicator bits for these sectors are set to '1'. Sectors n21, n22, n31, n32, and n33 belong to BTA2 and BTA3, both of which are different from the current sector's tracking area, BTA1. Hence, the indicator bits for these sectors are set to '0'. If TAUEI for the current sector (e.g. sector with strongest pilot) is enabled and timer $T_{reg}$ has expired, mobile stations examine the indicator bits corresponding to candidate neighbors (e.g. M strongest sectors that have satisfied adding criteria and have not yet been dropped) in order to determine changes in tracking area from the previous transmission of a tracking area registration, as shown in step S32. If a change is detected, then a tracking area registration that indicates this change is sent and the timer $T_{reg}$ is restarted, as shown in step S33.

TABLE 1

| | BTA | | | | | | | |
|---|---|---|---|---|---|---|---|---|
| | BTA 1 | | | BTA 2 | | BTA 3 | | |
| Neighbor | n11 | n12 | n13 | n21 | n22 | n31 | n32 | n33 |
| Bitmap | 1 | 1 | 1 | 0 | 0 | 0 | 0 | 0 |

Bitmap indicating BCMCS tracking area (BTA) changes for neighbor sectors;
BTA 1 denotes the tracking area of the strongest serving sector.

(c) BCMCS Cluster Ordered Neighbor Sector Tracking Area Indicator Bitmap

Here, cases where more than one neighbor sector belongs to the same tracking area (different from the strongest serving sector) can also be indicated. This allows unambiguous detection of tracking area changes and ensures that spurious registrations do not occur.

The method used for indication is as follows. Neighbor sectors that belong to the same tracking area are classified into clusters. The clusters of neighbors to a particular sector are then ordered starting with those belonging to the same tracking area as the sector. Sector identifiers (e.g. PN offsets in cdma2000) of neighbor sectors (i.e., the neighbor list) are indicated in overhead messages in this order. For mobile station tracking with BCMCS, a single indicator bit is then transmitted for each neighbor sector thus resulting in the transmission of a run of bits for a cluster of neighbors within the same tracking area, as shown in step S31. The indicator bits for all neighbors within a cluster except the first one are set to the same value (say 1, without loss of generality). The indicator bit for the first neighbor within a cluster is toggled in order to denote the change in tracking area corresponding to cluster boundaries (with the exception of the first cluster) An exemplary bitmap generated using this approach is shown in Table 2.

Since the neighbor list is ordered into groups (sectors corresponding to BTA1 first, sectors corresponding to BTA2 next, etc.), the bitmap can be used to indicate when the BTA corresponding to the current sector is different from the BTA of the previous sector in the ordered list. For example, n21 corresponds to a different BTA than that of the previous sector, n13. Hence, the indicator bit for n21 is set to '0'. The next sector, n22, shares the same BTA as the previous sector in the ordered list, n21, and its indicator is set to '1'. The next sector, n31, has a different ETA than that of n22, so its indicator bit denotes a change and is set to '0'. The mobile therefore knows each sectors' identifier and the order of the neighbor list (each sector in the ordered list is referenced by its identifier). Hence, the mobile can simply look up the indicator bit for any particular sector and determine whether its tracking area matches that of the sector transmitting the bitmap. If TAUEI for the strongest serving sector (e.g. sector with strongest pilot) is enabled and timer $T_{reg}$ has expired, mobile stations examine the indicator bits corresponding to candidate neighbors (e.g. M strongest sectors that have satisfied adding criteria and have not yet been dropped) in order to determine changes in tracking area from the previous transmission of a tracking area registration, as shown in step S32. If a change is detected, then a tracking area registration that indicates this change is sent and the timer $T_{reg}$ is restarted, as shown in step S33.

TABLE 2

| | BTA | | | | | | | |
|---|---|---|---|---|---|---|---|---|
| | BTA 1 | | | BTA 2 | | BTA 3 | | |
| Neighbor | n11 | n12 | n13 | n21 | n22 | n31 | n32 | n33 |
| Bitmap | 1 | 1 | 1 | 0 | 1 | 0 | 1 | 1 |

Cluster ordered bitmap indicating BCMCS tracking area (BTA) changes for neighbor sectors;
BTA 1 denotes the tracking area of the strongest serving sector.

The tracking of users across a network in accordance with the exemplary embodiments may be advantageous for a number of reasons. The method provides reasonably accurate information regarding the whereabouts of subscribers within each multicast group, i.e., sectors where radio resources need to be allocated at the start of a BCMC call. A network or system employing the tracking methods may make efficient use of downlink and uplink overhead for tracking, and may achieve greater reliability and/or reduced power requirements by allowing channels carrying BCMCS content to be in soft handoff. Further, mobile station battery life may be conserved by avoiding unnecessary uplink and downlink activity (e.g. excessive or spurious registrations).

The use of BCMCS Tracking Areas (TA) may enable improved tracking of BCMCS subscribers, thereby achieving improved spectral efficiency. Since BCMCS tracking areas may be used for assigning radio resources to BCMC traffic and not solely for paging, the tracking areas are likely to have much finer granularity than registration zones or paging zones. Additionally, maximum flexibility may be achieved by defining the corresponding network and mobile station procedures independently of unicast location areas or paging zones. Paging zones are built primarily for paging and may have specific procedures. BCMCS tracking areas are built for BCMC services and may have different procedures. Separating the two concepts may enable each procedure, paging and BCMCS, to be maximized. Tracking area change registrations are not meant to replace other types of registrations, but are intended to complement other types of registrations in order to provide a network with a substantial set of controls that help balance the tradeoff between the uplink overhead and the level of tracking desired.

The exemplary embodiments of the invention being thus described, it will be obvious that the same may be varied in many ways. Such variations are not to be regarded as departure from the spirit and scope of the exemplary embodiments of the invention, and all such modifications as would be obvious to one skilled in the art are intended to be included within the scope of the following claims.

What is claimed is:

1. In a network supporting a broadcast-multicast service and serving a plurality of sectors, a method by which a mobile user determines a change in tracking area, comprising:
    receiving, by the mobile user, mapping data classifying groups of sectors into a plurality of tracking areas, each sector having one or more groups of mobile users, the mapping data associates a given sector identifier for each sector to one of the plurality of tracking areas to create associations between each sector and tracking area that are known to each mobile user of the one or more groups;
    receiving, by the mobile user, at least two pilot signals from at least two of the sectors;
    if a tracking area update enabled indicator for a current sector that has not been dropped is enabled and a timer interval has expired, comparing, by the mobile user, each of the at least two pilot signals to a threshold based on an adding criteria; and
    determining, by the mobile user, a change in tracking area from a previous transmission of a tracking area registration based on the comparing and the mapping data.

2. The method of claim 1, further comprising:
    determining the mapping data based on one or more of pilot PN offset detection, primary scrambling code detection and explicit signaling from the network.

3. In a network supporting a broadcast-multicast service and serving a plurality of sectors, groups of sectors further classified by the network into a plurality of tracking areas, each sector having one or more groups of mobile users, a method by which one of the mobile users indicates a tracking area change to the network, comprising:
    each sector transmitting a list of neighbor sectors to each user in the sector, the list including an indicator for each neighbor sector, the indicator including a bit indicating whether each neighbor sector is within a same tracking area as the transmitting sector;
    the one of the mobile users
        if a tracking area update enabled indicator for a current sector is enabled and a timer interval has expired, comparing a pilot signal strength and indicator bit of each of the neighbor sectors on the list that have not been dropped to determine changes in tracking area from a previous transmission of a tracking area registration; and
        transmitting a registration message indicting a change in tracking area to the network, based on the comparing.

4. In a network supporting a broadcast-multicast service and serving a plurality of sectors, groups of sectors further classified by the network into a plurality of tracking areas, each sector having one or more groups of mobile users, a method by which one of the mobile users determines a tracking area, comprising:
    classifying neighboring sectors belonging to the same tracking area into an ordered neighbor sector list;
    each sector transmitting a bitmap of sector identifiers to indicate whether a tracking area of a current sector is different from the tracking area of a previous sector in the neighbor sector list, so that each of the mobile users knows each sector identifier and each neighboring sector belonging to a different tracking area of the previous sector;
    if a tracking area update enabled indicator for a current sector is enabled and a timer interval has expired, the one of the mobile users comparing a pilot signal strength of the neighbor sectors and indicator bits of the bitmap corresponding to the neighbor sectors to determine changes in tracking area from a previous transmission of a tracking area registration; and
    transmitting a registration message indicting a change in tracking area to the network, based on the comparing.

5. The method of claim 4, further comprising:
    the network assigning indicator bits to represent neighbor sectors of the ordered candidate neighbor list; and
    the accessing the bitmap step further comprising the one of the mobile users looking up an indicator bit for a particular sector to determine if the sector's tracking area matches that of the one of the mobile users.

* * * * *